United States Patent [19]
Borello

[11] 3,894,439
[45] July 15, 1975

[54] INFINITE SPEED DRIVE
[76] Inventor: Domenic Borello, 142 Nyach Ave., Pelhem, N.Y. 10803
[22] Filed: July 26, 1974
[21] Appl. No.: 492,347

[52] U.S. Cl. .............................. 74/192; 74/217 CV
[51] Int. Cl.² .................... F16H 15/16; F16H 15/42
[58] Field of Search .......... 74/192, 190, 190.5, 191, 74/217 R, 217 CV, 796

[56] References Cited
UNITED STATES PATENTS
| | | | |
|---|---|---|---|
| 691,789 | 1/1902 | Mann | 74/793 |
| 3,043,149 | 7/1962 | Davin et al. | 74/192 |

Primary Examiner—Samuel Scott
Assistant Examiner—Allan R. Burke
Attorney, Agent, or Firm—Bauer & Amer

[57] ABSTRACT

A belt-interconnected pair of cones of an infinite speed drive in which additional cones cooperate therewith to apply compression on the belt to firstly cause shifting movement of the belt into any selected position providing any desired output speed, and secondly to achieve positive contact with the belt in the nip between the cones so that slippage, which detracts from the power output, is effectively minimized. In a preferred form, said positive belt contact is achieved by the establishment of an intermeshing drive between the driving and driven cones and their respective cooperating additional cones, between which cones the belt is nipped and urged through its lengthwise movement which results in the transfer of power from the driving cone to the driven cone.

5 Claims, 6 Drawing Figures 3,894,439

INFINITE SPEED DRIVE

The present invention relates generally to infinite speed drives which utilize a cooperating pair of driving and driven cones, and more particularly to an improved method and means of shifting the pulley belt of said cones into any output speed position and also of improving the efficiency of operation of the drive.

It is already well known that the differences in the diameter sizes of driving and driven cones mounted 180 degrees out of phase with each other can effectively be used as a variable speed power transmitting mechanism. The patent literature, as exemplified by U.S. Pat. No. 856,846, also abounds with the disclosure of numerous methods and techniques of shifting the belt in driving connection between the driving and driven cones into changing positions therealong so as to achieve corresponding speed-torque outputs. These prior art methods and techniques invariably include a roller or other such device, about which the belt is appropriately entrained, which is urged through movement to produce the desired positioning movement in the belt. The foregoing, although operable, are not entirely satisfactory, if only because the surface conditions which enable sliding movement of the belt into new positions, must, of necessity, contribute to slippage between the belt and the driving and driven cones, and thus adversely affect the efficiency of operation of the infinite speed drive.

Broadly, it is an object of the present invention to provide an improved infinite speed drive overcoming the foregoing and other shortcomings of the prior art. Specifically, it is an object to achieve belt-shifting movement for a belt that is entrained with an extent of tension about the driving and driven cones which does not significantly interfere with said shifting movement; however, in each operative position of the belt, there is a positive contact made with the belt during its driving function so as to minimize any slippage between the cones and said belt.

In a belt-interconnected pair of driving and driven cones demonstrating objects and advantages of the present invention there is provided a pulley belt-positioning means comprising two additional cones mounted respectively adjacent said driving and driven cones and each movable into an operative position adjacent to these cones so as to bound a clearance therebetween of a progressively increasing extent. In the confined area of the wedge-shaped clearance, the belt is under compression and, in practice, reacts by moving towards the area of diminished compression until attaining a position of equilibrium. In all drive positions, however, the belt is nipped sufficiently to press it into firm contact with the cones to obviate any slippage therebetween.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 3:
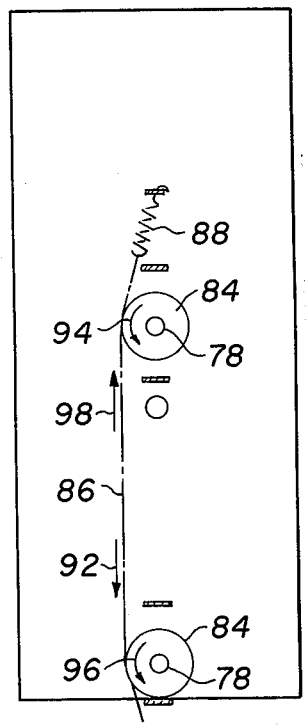
Figures 4A, 4B:
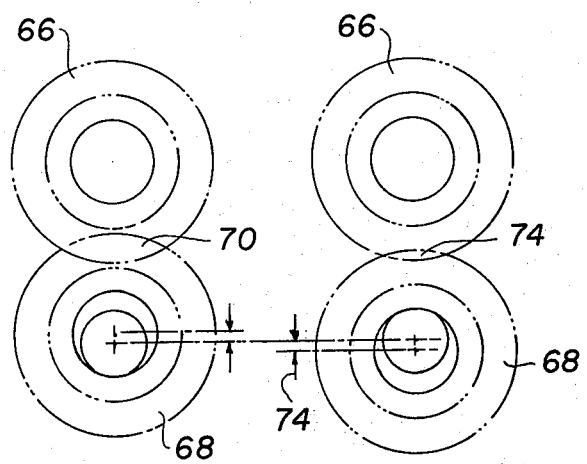
Figure 2:
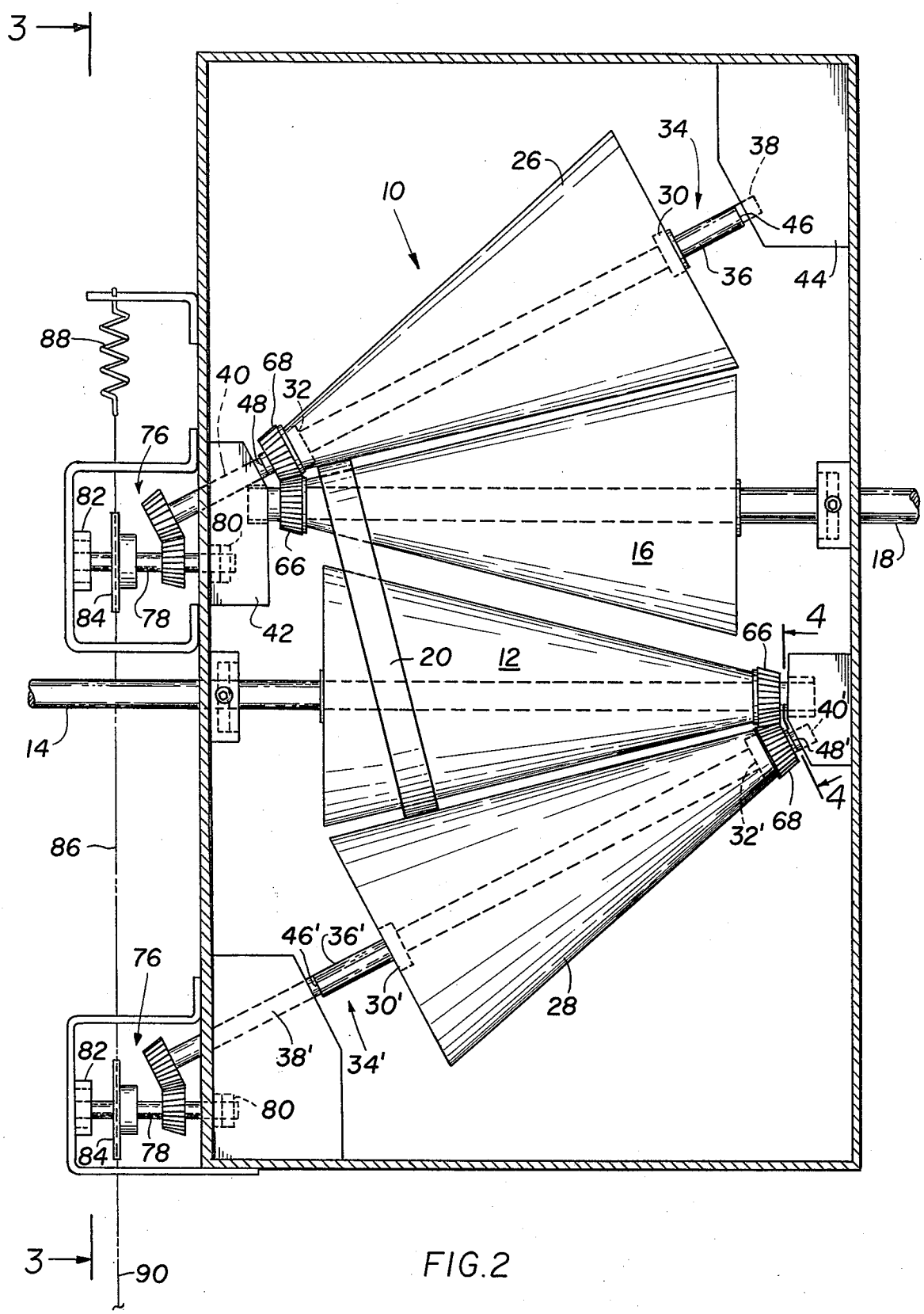
FIG. 2 is a more detailed view of the driving, driven, and idler cones which comprise the infinite speed drive according to the present invention.

FIG. 3 is a side elevational view, in reduced scale, taken on line 3—3 of FIG. 2, illustrating an exemplary control unit for the infinite speed drive hereof; and FIGS. 4a and 4b are end elevational views, taken on line 4—4 of FIG. 2, illustrating the cooperative relation of bevel gears at the times before and after control movements of a cooperating group of cones of the within apparatus.

Figure 1A:
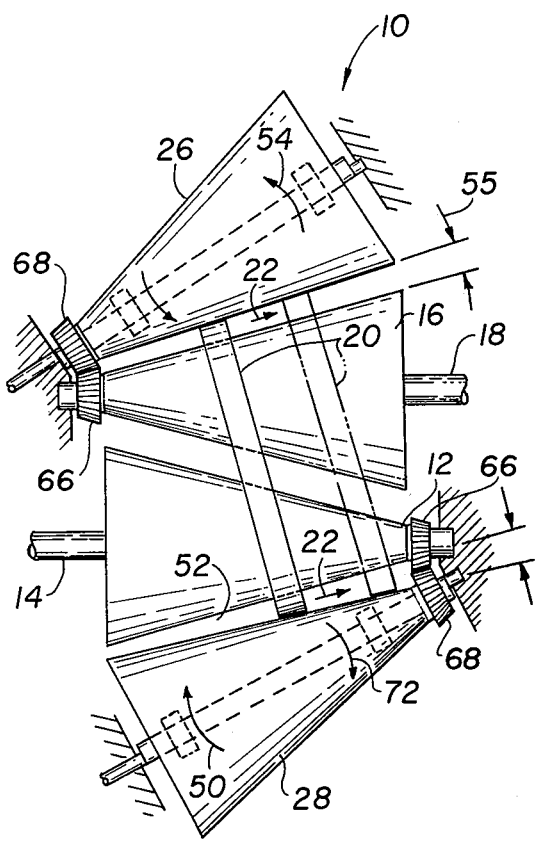
FIG. 1a is a perspective view illustrating the position of the idler cones producing pulley belt movement from left to right relative to the driving and driven cones.
Figure 1B:
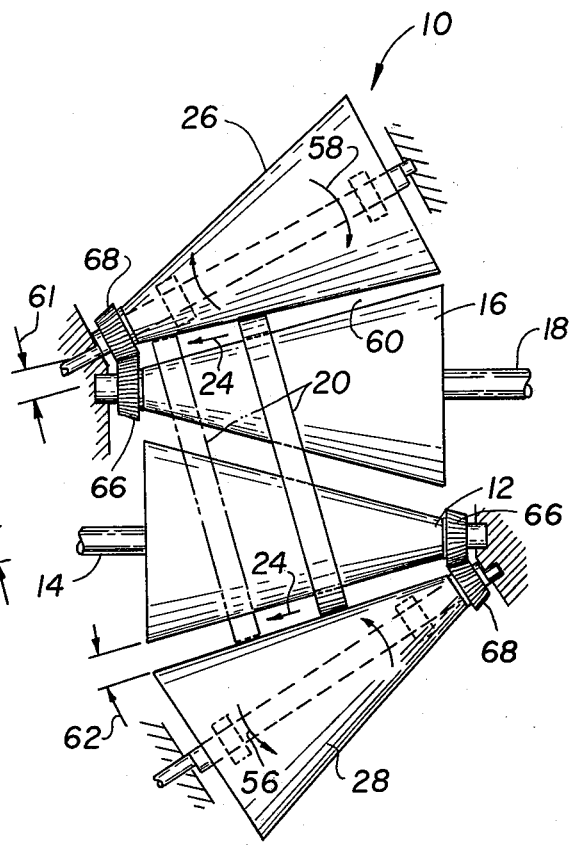
FIG. 1b is a view similar to FIG. 1a but illustrating the manner of achieving pulley belt movement in the opposite direction.

Reference is now made to the drawings, and in particular to FIGS. 1a, 1b and 2, wherein there is shown an infinite speed drive, generally designated 10, demonstrating objects and advantages of the present invention. Like many prior art infinite speed drives, drive 10 includes conical drive members, and specifically a driving cone 12 which will be understood to be powered in rotation by an electric motor or the like, as at 14, and a driven cone 16, whose rotation and torque is tapped off, as at 18. As generally understood, the driving cone 12 powers the driven cone 16 in rotation via an endless pulley belt 20 appropriately entrained about the cones, as illustrated. In FIG. 2, pulley belt 20 is shown in an extreme left position, and in that position each rotation of driving cone 12 produces a multiple of rotations in the driven cone 16, due to the difference in diameter of these cones in the plane of operation of the pulley belt 20. Thus, the output 18 of driven cone 16 is at a high rotational speed with corresponding low torque. If, however, the pulley belt 20 is moved from left to right, to a position for example as illustrated in FIG. 1a, a number of rotations of driving cone 12 is necessary to produce a single rotation in driven cone 16, with the result that the rotational output 18 is at a low rotational speed, but with high torque. As already noted, the above is well understood and is conventional in the operation of infinite speed drives.

The noteworthy contribution of the within invention is the greatly facilitated manner of achieving any desired operative position of the pulley belt 20 with respect to the driving and driven members or cones 12, 16. Specifically, as best illustrated in FIGS. 1a and 1b, in a manner which will be described in detail subsequently, it is readily possible according to the present invention to shift pulley belt 20 from left to right, or in the direction 22 (note FIG. 1a), and to thereby achieve any desired corresponding low speed-high torque output 18. It is similarly possible, as illustrated in FIG. 1b, to readily achieve opposite direction movement 24 in pulley belt 20, and thereby obtain any selected corresponding high speed-low torque output 18.

The usefulness of the infinite speed drive 10 hereof is, of course, vast, since there are many industrial applications where variation in speed and torque is an essential requirement. One particular end use which is mentioned not for purposes of limitation, but to illustrate the utility of the drive 10, is in connection with an electrically operated vehicle. In this end use, it will be understood that battery operated electric motors of the vehicle are drivingly connected to the power input shaft 14, while the power output shaft 18 is connected to power the vehicle wheels in rotation. For start up of the vehicle, the appropriate output 18 is one of low speed, high torque which starts the vehicle in motion by adequately overcoming the inertia, weight, and other such motion-resisting factors. Thereafter, drive 10 is effective in providing a normal cruising speed for the vehicle, which is achieved by a higher speed, lower torque output 18.

To achieve, in a greatly facilitated manner, movement of pulley belt 20 in one or the other of the directions 22, 24, use is made of pulley belt-positioning means including cones 26 and 28 respectively mounted on opposite sides of the pulley-interconnected driving and driven cones 12, 16. In the respect that the cones 26 and 28 are not directly powered in rotation by the prime mover powering the driving cone 12, said cones 26 and 28 are somewhat in the nature of idler members. However, as will be described subsequently, said cones 26 and 28 are powered in rotation, through gearing, by the cones 12 and 16, respectively, and thus assist in a positive manner in urging the pulley belt 20 through lengthwise movement in the nip formed between the cones 12, 28, on the one hand, and the cones 16, 26, on the other hand. Since the construction and mounting of each of the belt-positioning or idler cones 26 and 28 are substantially identical, for brevity's sake the description thereof will be given only in connection with cone 26. Said cone is journalled for rotation in bearings 30 and 32 on a support shaft 34. A significant feature of the shaft 34 is that it includes an offset 36, similar to that which is found in a crankshaft. That is, cone 26 is journalled for rotation on the offset length portion 36 of shaft 34, while the opposite end portions 38 and 40 of the shaft are respectively mounted in support blocks 42 and 44. As a result of the foregoing construction, it is thus possible to rotate cone 26 through a pivotal traverse about the rotation axis of the aligned shaft ends 38 and 40. The radius of this rotational traverse is a function of the extent or amount of offset that exists between the shaft length portion 36 and the shaft ends 38 and 40. This offset or throw in the length portion 36 is embodied in the shaft 34 at the locations 46 and 48, as illustrated in FIG. 2.

Not only is cone 26 mounted so as to partake of a slight pivotal traverse towards and away from the driven cone 16, in the manner just indicated, but so also is idler cone 28, but in relation to the driving cone 12. In this connection, the parts of idler cone 28 and of its mounting which are similar to those parts just described in connection with cone 26 are designated by the same, but primed, reference numeral.

At this point in the description it is convenient to again refer back to FIGS. 1a and 1b which best illustrate the manner in which pivotal traverses of the idler cones 26 and 28 produce pulley belt movement in either the direction 22 or 24. As illustrated in FIG. 1a, following a pivotal traverse 50 in idler cone 28, a clearance 52 is created between the idler cone 28 and the driving cone 12 which is characterized by a progressively increasing dimension or size in the direction 22. In the operation of the drive 10, when clearance 52 is created, it is contemplated that simultaneously with the pivotal traverse 50 in idler cone 28, that idler cone 26 will be pivoted in the direction 54 into a "neutral" position in which it will occupy a remote, clearance position sufficiently spaced from the driven cone 16 as to have no significant effect of the operation of that cone or on the pulley belt 20 thereof. In said neutral position of idler cone 26, the clearance 55 between this cone and the driven cone 16 is of an extent where there is no squeezing or compressive force exerted on the pulley belt 20 in interposed position therebetween. On the other hand, as noted, the operative position of the idler cone 28 in relation to the driving cone 12 is such that at the small end of the wedge shaped clearance 52, there is a considerable pressure or compression exerted on the pulley belt 20. Pulley belt 20 responds to this compression by moving in the direction 22, i.e. in a direction towards the progressively increasing size of the clearance 52. This is analogous to fluid taking the course of least resistance in a situation where it can flow either one way or the other.

Eventually, pulley belt 20 assumes an equilibrium position in which pressure exerted upon it in the clearance 52 equals the slight pressure exerted on it by virtue of the spacing 54 existing between the idler cone 26 and driven cone 16. Before this occurs, however, it should be readily appreciated that the shifting movement 22 in the pulley belt 20 enables the selection of any desired rotational speed-torque output 18. It is of course not necessary for pulley belt 20 to be urged through movement 22 to an extreme end position in every instance, and this can be avoided simply by controlling the extent of the pivotal traverse 50 in the idler cone 28.

To achieve opposite direction movement 24 in the pulley belt 20, it is merely necessary to back off the idler cone 28 from its operative position in relation to the driving cone 12 by urging this cone through a pivotal traverse 56 and simultaneously therewith pivoting idler cone 26 in the direction 58 towards the driven cone 16. The foregoing does for the idler cone 26 what has already been described in connection with the idler cone 28, namely, to create the clearance 60 between the idler cone 26 and the driven cone 16, which is characterized in that it is of a progressively increasing size in the direction 24. Thus pulley belt 20 in occupying an extreme position to the right, as viewed in FIG. 1b, will therefore be in the small end of the clearance 60 and thus experiencing an application of pressure against it by the idler cone 26. This induces pulley belt 20 to move from right to left, in the direction 24, until there is an equilibrium of pressure because of the approximate identical size 61 and 62 in the clearances which exist between the idler cones 26 and 28 and the pulley-interconnected driving and driven cones 12, 16.

So as not to impede or adversely interfere with driving movement of pulley belt 20, i.e. lengthwise movement thereof, means are provided to rotate the idler cones 26 and 28, whether they are in their close proximate positions to the cones 12, 16 or in their remote clearance position, at the same rotational speeds as said cones 12, 16. In fact, rotation of the cones 16 and 26 at the same rotational speed functions as a positive grip on the opposite surfaces of the pulley belt 20 to drive the same through the nip formed between these two cones so as to minimize slippage between the belt and driven cone 16. In similar fashion, the simultaneous rotation of the cones 28 and 12 assists in driving the belt through the nip of these cones. The means providing said rotation in the cones 26 and 28, in the preferred form illustrated herein, consists of intermeshing bevel gears 66 and 68. As best shown in FIGS. 4a, 4b, bevel gear 66 of the driving cone 12 is in full intermeshing relation, as at 70, with the bevel gear 68 on idler cone 28 when said cone is in the operative position illustrated in FIG. 1a. After a back-off pivotal traverse 72 (note FIG. 1a) of idler cone 28, which results in movement of bevel gear 68 a slight distance away from bevel gear 66, i.e. a distance equal to the throw of the offset 36 of the support shaft of the idler cone 28, there is still meshing engagement, as at 74, between the gears. Thus, at all times, the idler cones 26 and 28 rotate at the same speed of rotation as the pulley-interconnected driving and driven cones 12 and 16, respectively. To achieve this speed relationship, and also to permit the creation of clearances 52 and 60 of varying size along the cones 12, 16, the idler cones 26 and 28 are disposed in the same orientation of the cones with which they cooperate in the drive 10. On the other hand, to achieve the speed variation between the driving cone 12 and driven cone 16, these cones are disposed in a 180° out of phase relation, so that in the plane of the endless pulley 20 there is a variation in diameter between the cones 12 and 16 to produce a corresponding variation between the input and output rotational speeds of these cones.

One method of controlling the pivotal traverses in the idler cones 26 and 28 which is particularly advantageously used in the operation of an electric vehicle will now be described. This control, as best illustrated in FIGS. 2 and 3, includes cooperating intermeshing gears 76 which when operated, in a manner which will now be described, are effective in producing the pivotal traverses required in the idler cones 26, 28 about their respective rotational axes. Specifically, and using idler cone 26 as an example, the meshing group of gears 76 includes one gear of the group appropriately fixedly connected to a shaft 78 mounted in opposite end bearings 80 and 82. Also fixedly mounted on the shaft 78 is a sprocket 84. As best shown in FIG. 3, disposed in meshing engagement with each of the sprockets 84 for each of the idler cones 26 and 28 is a chain drive 86 connected at one end to a return spring 88 and at its opposite end, as at 90, to a control component of the vehicle. Said vehicle component would be the equivalent of an accelerator pedal of a conventional gasoline fueled vehicle.

Let it be assumed that the vehicle is being operated under conditions requiring providing it with its cruising speed and that this, in turn, contemplates a depression of the accelerator pedal and thus movement 92 in the chain drive 86. This direction of movement in the chain drive 86, as illustrated in FIG. 3, results in a rotational traverse 94 and thus a pivotal traverse in the offset shaft 34 of idler cone 26. Simultaneously, there is also caused a rotational traverse 96 in the support shaft of the idler cone 28. As a consequence, the appropriate clearances are created between these idler cones and the belt-interconnected driving and driven cones 12, 16 to produce directional movement 24 in pulley belt 20 to correspondingly contribute to the rotational output 18 providing the cruising speed for the vehicle. In similar fashion, release of the accelerator pedal 90 enables the return spring 88 to urge the chain drive 86 through movement 98 to, in turn, produce pulley belt movement in the opposite direction 22. In this manner, manipulation of the accelerator pedal 90 for the vehicle enables the driver of the vehicle to exercise control over the speed of operation of the vehicle, in much the same way that manipulation of the gas pedal enables the driver to exercise speed control in a conventional gas fueled vehicle.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spriit and scope of the invention herein.

What is claimed is:

1. An infinite speed drive including a motor-powered driving cone, a driven cone oriented 180° out of phase with and operatively arranged to be powered in rotation by said driving cone, an endless pulley belt entrained about said cones to provide said powering drive therebetween and to provide a speed of rotation in said driven cone which is a function of the position of said endless pulley belt along the lengths of said cones, and pulley belt-positioning means comprising a first and a second idler cone mounted respectively adjacent said driving and driven cones and movable into an operative position adjacent thereto bounding a clearance therebetween of a progressively increasing extent so as to urge said pulley belt in movement along said driving and driven cones in the direction of increased size of each said clearance, said idler cones being oriented in 180° out of phase relation to each other to correspondingly provide said clearances of progressively increased size in opposing directions for inducing pulley belt movement relative to said driving and driven cones also in opposing directions therealong, offset shafts respectively rotatably supporting said idler cones, and control means for rotating said offset shafts in coordinated relation such that at any one time only a selected one of said idler cones is providing pulley belt-positioning service, whereby said pulley belt is readily shiftable along said driving and driven cones into an operative position providing any desired output rotational speed in said driven cone.

2. An infinite speed drive as claimed in claim 1 wherein said control means includes means effective to simultaneously move one said idler cone closer to, and the other idler cone further away from, said pulley belt-interconnected driving and driven cones.

3. An infinite speed drive as claimed in claim 2 wherein said driving cone and one said cooperating idler cone, and said driven cone and said other cooperating idler cone, are respectively in meshing relation with each other so as not to impede power transmitting movement of said pulley belt in its driving connection between said driving and driven cones.

4. An infinite speed drive as claimed in claim 3 wherein two groups of gears provide said intermeshing relation and they are located on opposite sides of said pulley belt-interconnected driving and driven cones, to thereby function as position-limiting stops for said shiftable pulley belt.

5. An infinite speed drive as claimed in claim 4 wherein the gears of said two groups are of the bevel type so that there is meshing engagement therebetween even after rotation of an offset shaft discontinuing said pulley belt-positioning service of said idler cone on said offset shaft.

* * * * *